(12) United States Patent
Gautru et al.

(10) Patent No.: US 10,069,355 B2
(45) Date of Patent: Sep. 4, 2018

(54) ROTOR FOR ROTARY ELECTRICAL MACHINE

(71) Applicant: VALEO EQUIPEMENTS ELECTRIQUES MOTEUR, Creteil (FR)

(72) Inventors: Jean-Francois Gautru, Montreuil (FR); Pierre Faverolle, Montegeron (FR)

(73) Assignee: Valeo Equipments Electriques Moteur, Creteil (FR)

( * ) Notice: Subject to any disclaimer, the term of this patent is extended or adjusted under 35 U.S.C. 154(b) by 186 days.

(21) Appl. No.: 15/175,265

(22) Filed: Jun. 7, 2016

(65) Prior Publication Data

US 2016/0359383 A1 Dec. 8, 2016

(30) Foreign Application Priority Data

Jun. 8, 2015 (FR) .................................. 15 55190

(51) Int. Cl.
*H02K 1/24* (2006.01)

(52) U.S. Cl.
CPC ......... *H02K 1/243* (2013.01); *H02K 2201/03* (2013.01)

(58) Field of Classification Search
CPC ...................................................... H02K 53/00
USPC .................................................. 310/156.46
See application file for complete search history.

(56) References Cited

U.S. PATENT DOCUMENTS

| 5,021,698 | A  | * | 6/1991  | Pullen ................. | H02K 1/2793 |
|           |    |   |         |                        | 310/112     |
| 7,385,332 | B2 | * | 6/2008  | Himmelmann ....... | H02K 21/027 |
|           |    |   |         |                        | 310/190     |
| 2004/0232799 | A1 | * | 11/2004 | Chen .................. | H02K 21/044 |
|           |    |   |         |                        | 310/263     |
| 2005/0269897 | A1 | * | 12/2005 | Maeda ................ | H02K 21/044 |
|           |    |   |         |                        | 310/263     |
| 2007/0241628 | A1 | * | 10/2007 | Himmelmann ....... | H02K 21/027 |
|           |    |   |         |                        | 310/190     |
| 2009/0026856 | A1 | * | 1/2009  | Hamada ............... | H02K 5/20   |
|           |    |   |         |                        | 310/58      |

* cited by examiner

*Primary Examiner* — Terrance Kenerly
(74) *Attorney, Agent, or Firm* — Berenato & White, LLC

(57) ABSTRACT

A rotor for a rotary electrical machine, fitted such as to rotate around an axis (X), and comprising a pair of magnet wheels (17) which each have a flange (18) and a plurality of magnetic poles (19). Each magnetic pole (19) extends axially from the flange (18) towards a free end (26), and has an outer surface (27). The outer surface (27) of at least one magnetic pole (19) of at least one magnet wheel (17) has at least one decreasing segment (29). The decreasing segment (29) is configured such that a radius between the said outer surface (27) and the axis (X) of the rotor (4) decreases, when going along the said decreasing segment (29), towards the free end (26) of the said magnetic pole (19).

20 Claims, 2 Drawing Sheets

ROTOR FOR ROTARY ELECTRICAL MACHINE

CROSS-REFERENCE TO RELATED APPLICATIONS AND CLAIM TO PRIORITY

This application is related to Patent Application No. 1555190 filed Jun. 8, 2015 in France, the disclosure of which is incorporated herein by reference and to which priority is claimed.

FIELD OF THE INVENTION

The invention relates to a rotor for a rotary electrical machine.

The invention has a particularly advantageous application in the field of rotary electrical machines such as alternators or alternator-starters. It will be remembered that an alternator-starter is a rotary electrical machine which can work reversibly, firstly as an electric generator when functioning as an alternator, and secondly as an electric motor, in particular in order to start the thermal engine of the motor vehicle.

BACKGROUND OF THE INVENTION

A rotary electrical machine comprises a rotor which is mobile in rotation, and has a constant machined outer diameter. This rotary electrical machine additionally comprises a fixed stator which surrounds the rotor. The rotor and the stator are separated from one another by an air gap with a constant width. When the rotor is rotating, it induces a magnetic field on the stator, which transforms this field into electric current in order to supply the electronics of the vehicle and recharge the battery.

In addition, motor vehicles have electrical energy consumption which is increasingly great, and the rotary electrical machines are therefore required to have increasingly high performance, in order to provide the electrical energy necessary. A solution to improve the performance of a rotary electrical machine is to increase the speed of rotation of the rotor. In fact, this makes it possible to increase the output of the rotary electrical machine.

However, increasing the speed of rotation amplifies the centrifuging effect corresponding to the mechanical deformation of claws of the rotor. Because of the centrifuging, the claws of the rotor could then rub on the inner diameter of the stator, and thus destroy the rotary electrical machine, or at least damage it.

In order to avoid the risks of friction between the rotor and the stator, the width of the air gap must then be increased. However, increasing this width amounts to moving the rotor away from the stator, which gives rise to a decrease in the performance of the rotary electrical machine.

SUMMARY OF THE INVENTION

The objective of the present invention is to make it possible to avoid the disadvantages of the prior art.

Thus, the objective of the present invention is to provide a rotary electrical machine, the electromagnetic performance of which is improved, whilst guaranteeing good resistance of the said rotary electrical machine to centrifuging.

The subject of the present invention is thus a rotor for a rotary electrical machine. According to the present invention, the rotor is fitted such as to rotate around an axis, and comprises a pair of magnet wheels which each have a flange and a plurality of magnetic poles, each magnetic pole extending axially from the flange towards a free end, and having an outer surface, the said outer surface of at least one magnetic pole of at least one magnet wheel having at least one decreasing segment, the said decreasing segment being configured such that a radius between the said outer surface and the axis of the rotor decreases, when going along the said decreasing segment, towards the free end of the said magnetic pole.

The decreasing segment is also defined as a segment belonging to a cross-sectional plane which comprises the axis of rotation of the rotor, and extends, on the axial outer surface of a magnetic pole, between a first end and a second end, such that the distance between the axis of rotation and the first end of the segment is greater than the distance between the axis of rotation and the second end of the segment, which is closer to the free end of the said magnetic pole than the first end. In other words, the outer surface of the magnetic pole does not extend parallel to the axis of the rotor, but towards the axis of the rotor, when going towards the free end of the magnetic pole.

Thus, the outer diameter of the rotor at the said magnetic pole is not constant along the axis of the rotor.

A radial width of an air gap, defined as a space between the outer surface of the rotor and an inner surface of a stator associated with the said rotor, is thus not constant. In addition, this also makes it possible for the air gap to have a width, in a radial direction, which increases when going axially towards the free end of the said magnetic pole.

The fact that the width of the air gap increases when going towards the free end of the magnetic pole makes it possible to obtain an air gap width which is both:

relatively small at the portion of the magnetic pole where the passage of the magnetic flux from the rotor to the stator is greatest, i.e. for the portion of the magnetic pole which is close to the flange; and relatively large at the free end of the magnetic pole which is the area most sensitive to resistance to mechanical centrifuging during the rotation of the rotor.

In fact, by acting in particular on the part of the magnetic pole of the rotor comprising the free end, the mechanical stresses on the global centrifuging of the magnetic pole are reduced. This therefore makes it possible to decrease the minimum air gap width value whilst maintaining an air gap width at the free end of the magnetic pole which is acceptable for preventing any contact between the rotor and the stator when the rotor is rotating.

A rotor with an outer surface of this type is thus designed to permit both resistance to centrifuging and an increase in the electric current produced by the corresponding rotary electrical machine at a given speed. In addition, a rotor with an outer surface of this type is also designed, for a given width of air gap, to permit the increase in the speed of rotation of the rotor, which therefore makes it possible to increase the electric current produced by the rotary electrical machine.

Advantageously, the radius decreases substantially linearly along the decreasing segment. This makes it possible to improve the resistance to centrifuging of the rotor, as well as to simplify the production of the rotor.

Advantageously, the radius decreases along the decreasing segment according to an angle of 20° or less relative to the axis of the rotor. This angle value makes possible a balance between the improvement in the output of electric current of the rotor and its good resistance to centrifuging.

In addition, the decreasing segment advantageously has a length in an axial direction of between 0.2 and 1 times the length of the outer surface of the corresponding magnetic pole.

Advantageously, the decreasing segment has two ends, one of which ends is combined with the free end of the magnetic pole.

According to an advantageous embodiment of the invention, the outer surface additionally has a chamfered segment which extends from an outer axial end of the flange. The chamfered segment extends on a cross-sectional plane comprising the axis of rotation of the rotor, on the axial outer surface of a magnetic pole, between a first end and a second end, such that the distance between the axis of rotation and the first end of the chamfered segment is less than the distance between the axis of rotation and the second end of the chamfered segment which is closer to the free end of the said magnetic pole than the first end. This chamfered segment makes it possible to improve the balancing of the rotor.

According to another advantageous embodiment of the invention, the outer surface additionally has at least one constant segment, which is configured such that the radius between the said outer surface and the axis of the rotor is constant along the said constant segment. The constant segment extends on a cross-sectional plane comprising the axis of rotation of the rotor on the axial outer surface of a magnetic pole, between a first end and a second end, such that the distance between the axis of rotation and the first end of the constant segment is equal to the distance between the axis of rotation and the second end of the constant segment which is closer to the free end of the said magnetic pole than the first end. This makes it possible to have an area where the outer surface of the rotor extends parallel to the axis of the rotor, i.e. where the distance between the axis of rotation and a point of the constant segment is the same irrespective of the point taken on the said constant segment. This constant segment makes it possible to avoid any area of throttling of the magnetic flux.

Advantageously, the constant segment extends axially between an outer axial surface of the flange and the decreasing segment. If applicable, the constant segment is closer to the flange than to the free end of the corresponding magnetic pole. This makes it possible for this area where the distance between the outer surface of the magnetic pole and the axis of rotation is identical to be in an area where the said outer surface is close to the stator, and thus an area where the air gap is small. The output of current of the rotary electrical machine is thus increased.

According to an advantageous embodiment, the constant segment is adjacent to the chamfered segment and to the decreasing segment. This makes it possible for this area where the distance between the outer surface of the magnetic pole and the axis of rotation is identical to be in an area where the said outer surface is closest to the stator, and therefore an area where the air gap is minimal. The output of current of the rotary electrical machine is thus increased.

In addition, the constant segment advantageously has a length in an axial direction of between 0.3 and 0.8 times the length of the outer surface of the corresponding magnetic pole. This constant segment length permits balancing between the increase in the electric current produced and good resistance to centrifuging of the rotor.

According to an advantageous embodiment, each magnetic pole of a single one of the magnet wheels has an outer surface comprising respectively at least one decreasing segment. The fact that all the magnetic poles of a single magnet wheel have the same form makes it possible to simplify the production of the magnet wheel, and thus of the rotor.

According to another advantageous embodiment, each magnetic pole of the two magnet wheels has an outer surface comprising respectively at least one decreasing segment. This makes it possible to obtain a constant radius of the outer surface on a radial plane, around the entire circumference of the rotor, and therefore to improve the performance of this rotor, as well as its resistance to centrifuging. Similarly, this makes it possible to have an air gap of the associated rotary electrical machine which is constant on a radial plane, around the entire circumference of the said machine, and thus to improve its performance, as well as its resistance to centrifuging.

Advantageously, each magnetic pole is in the form of a claw.

Finally, the present invention relates to a rotary electrical machine comprising a rotor as previously described. Thus, the width of the air gap the rotary electrical machine is designed to permit both resistance to centrifuging and improvement of the electromagnetic performance of the corresponding rotary electrical machine, at a given speed. In another configuration, the width of the air gap of the rotary electrical machine is also designed, for a given resistance to centrifuging and for a given air gap width, to permit the increase in the speed of rotation of the rotor, which thus makes it possible to improve the performance of the rotary electrical machine.

In addition, a rotary electrical machine as previously described can advantageously form an alternator or an alternator-starter.

BRIEF DESCRIPTION OF THE DRAWINGS

The invention will be able to be better understood by reading the following detailed description of non-limiting embodiments of the invention, and by examining the appended drawings, in which.

Elements which are identical, similar or analogous retain the same references from one figure to another.

DETAILED DESCRIPTION OF THE PREFERRED EMBODIMENT(S)

Figure 1:
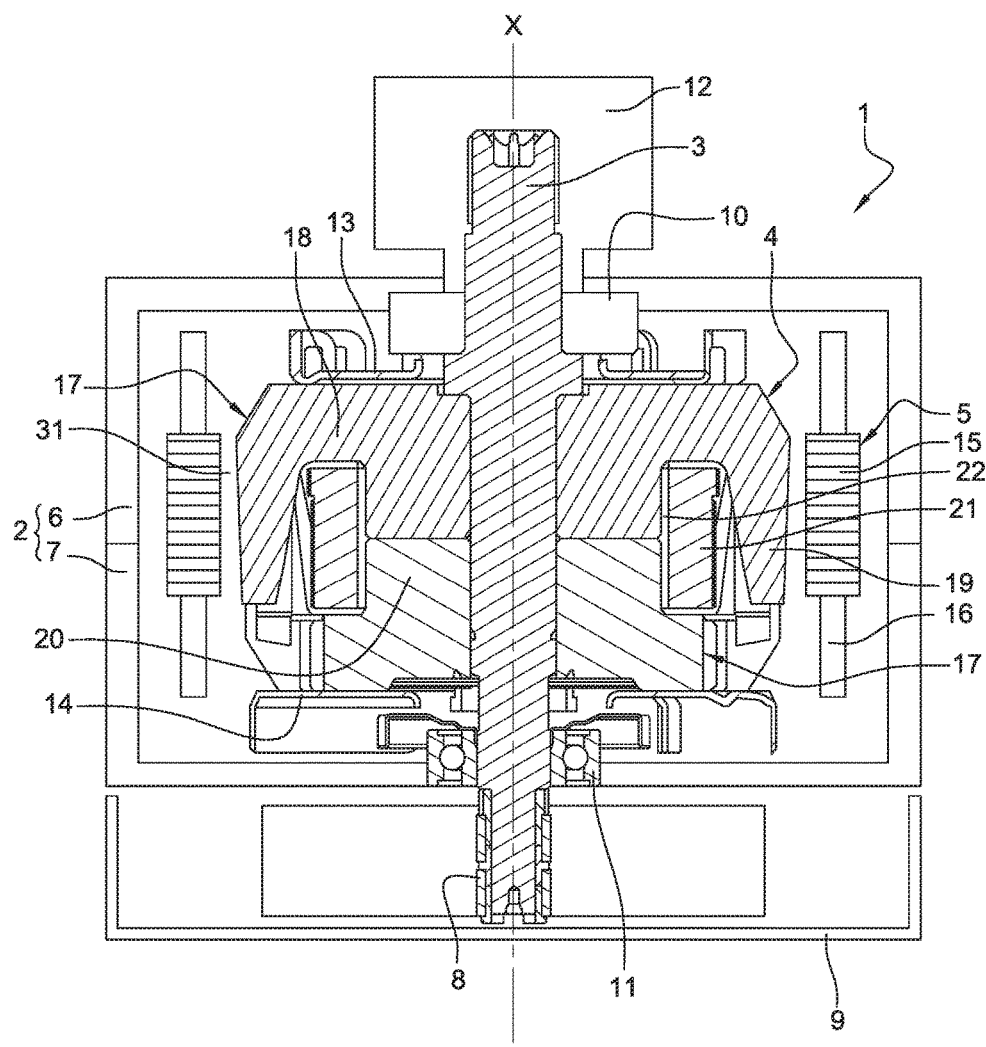
FIG. 1 represents schematically and partially a view in cross-section of a rotary electrical machine according to an embodiment of the invention.

FIG. 1 represents a polyphase compact rotary electrical machine 1, in particular for a motor vehicle. This rotary electrical machine 1 transforms mechanical energy into electrical energy in alternator mode, and can function in starter mode in order to transform electrical energy into mechanical energy.

The rotary electrical machine 1 comprises a housing 2. Inside this housing 2, it additionally comprises a shaft 3, a rotor 4 which is integral in rotation with the shaft 3, and a stator 5 which surrounds the rotor 4. The movement of rotation of the rotor 4 takes place around an axis X. Hereinafter in the description, the orientations radial, transverse and axial are to be considered relative to this axis X.

In this example, the housing 2 comprises a front bearing 6 and a rear bearing 7 which are assembled together. These bearings 6, 7 have a hollow form, and each support centrally a respective ball bearing 10, 11 for fitting of the shaft 3 with rotation.

A pulley 12 is secured on a front end of the shaft 3 at the front bearing 6, for example by means of a nut supported on the base of the cavity in this pulley. This pulley 12 makes it possible to transmit the movement of rotation to the shaft 3.

In this case, the rear end of the shaft 3 supports collector rings which belong to a collector, and are connected by wired connections to the winding. Brushes belonging to a brush-holder 8 are arranged such as to rub on the collector rings. The brush-holder 8 is connected to a voltage regulator contained in a rectifier bridge 9.

The front bearing 6 and the rear bearing 7 can additionally comprise substantially lateral openings for the passage of the air, in order to permit the cooling of the rotary electrical machine by means of circulation of air generated by the rotation of a front fan 13 on the front dorsal face of the rotor 4, i.e. at the front bearing 6, and that of a rear fan 14 on the rear dorsal face of the rotor, i.e. at the rear bearing 7.

In this embodiment, the stator 5 comprises a body 15 in the form of the set of plates provided with notches, for example of the semi-closed or open type, equipped with notch insulation for fitting of the phases of the stator. Each phase comprises at least one winding 16 which passes through the notches in the body 15, and forms together with all the phases a front chignon and a rear chignon on both sides of the stator body. The windings 16 are obtained for example from a continuous wire covered with enamel, or from conductive elements in the form of a bar, such as pins connected to one another. These windings 16 are for example three-phases windings which are connected in the form of a star or a triangle, the outputs of which are connected to the rectifier bridge 9.

The rotor 4 in FIG. 1 is a claw rotor. It comprises two magnet wheels 17. Each magnet wheels 17 is formed by a flange 18 and a plurality of magnetic poles 19. The rotor 4 additionally comprises a cylindrical core 20 which is interposed axially between the magnet wheels 17. In this case, this core 17 is in the form of two half cores each belonging to one of the magnet wheels 17.

Between the core 20 and the magnetic poles 19, the rotor 4 comprises a coil 21, in this case comprising a winding hub and an electric winding on this hub. The coil 21 can be wound on a coil insulator 22.

The rotor 4 can also comprise permanent magnets (not represented) interposed between two magnetic poles 19 adjacent to the outer periphery of the rotor. As a variant, the rotor 4 can be without such permanent magnets.

When the electric winding is supplied electrically by the brushes, the rotor 4 is magnetised and becomes an inductor rotor with formation of magnetic North-South poles at the magnetic poles 19. This inductor rotor creates an alternating induced current in the induced stator when the shaft 3 is rotating. The rectifier bridge 9 then transforms this alternating induced current into a direct current, in particular in order to supply the charges and consumers of the on-board network of the motor vehicle, as well as to recharge its battery.

Figure 2:
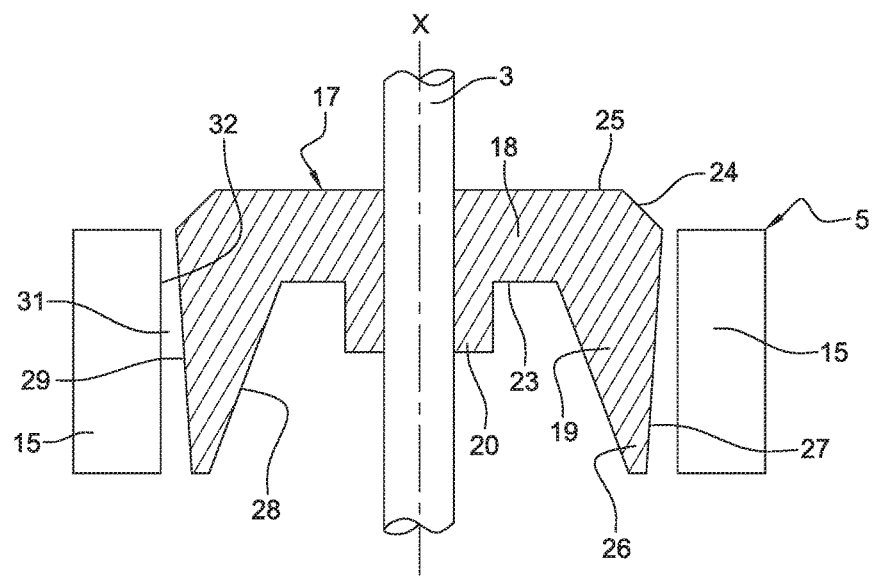
FIG. 2 represents schematically and partially a view in cross-section of a rotor and a stator in FIG. 1.

FIG. 2 illustrates more specifically one of the magnet wheels 17 of the rotor 4 in FIG. 1. The magnet wheel 17 has a flange 18 with transverse orientation. In this case, the flange 18 has an annular form which is delimited by an outer axial surface 25 extending substantially perpendicularly to the axis X, and an inner axial surface 23 extending substantially perpendicularly to the axis X.

The magnet wheel 17 additionally has a plurality of magnetic poles 19. The magnetic poles 19 each preferably have a trapezoidal form, and in particular the form of a claw. Each of the magnetic poles 19 extends in a substantially axial direction from the flange 18, to a free end 26 of the corresponding magnetic pole 19.

The magnetic poles 19 of a magnet wheel face respectively axially towards the flange 18 of the other magnet wheel, with each magnet wheel 19 penetrating in the space which exists between two adjacent magnetic poles of the said other magnet wheel, such that the magnetic poles 19 of the two magnet wheels 17 are imbricated.

Each magnetic pole 19 has respectively an outer surface 27 opposite the stator 5, and an inner surface 28 radially opposite the said outer surface 27. The outer surface 27 and the inner surface 28 extend substantially axially, respectively. The outer surface 27 of each of the magnetic poles 19 extends substantially axially between the outer axial surface 25 of the flange 18 and the free end 26.

The outer surface 27 of the magnetic pole 19 of the magnet wheel 17 has a decreasing segment 29 which is configured such that a radius between the outer surface 27 and the axis X of the rotor 4 decreases when going along the decreasing segment 29 towards the free end 26 of the corresponding magnetic pole 19.

For example, the distance between the axis X and the outer surface 27 at the free end 26 is smaller than the distance between the axis X and the outer surface 27 at an end of the decreasing segment 29 which is axially opposite the free end 26. In this case, an end of the decreasing segment 29 is combined with the free end 26.

In the embodiment in FIG. 2, the inner surface 28 has a segment which is configured such that a radius between the inner surface 28 and the axis X of the rotor 4 increases when going along the segment, towards the free end 26 of the corresponding magnetic pole 19. In a variant embodiment, this segment could be configured such that a radius between the inner surface 28 and the axis X of the rotor 4 is constant, when going along the segment towards the free end 26 of the corresponding magnetic pole 19.

In the two above-described configurations, the free end 26 of the magnetic pole 19 is the part of the said magnetic pole which has a minimal radial width. In addition, the outer surface 27 is closer to the axis X at the free end 26 than at the part of the magnetic pole 19 which is close to the flange 18, and thus further from the stator 5.

In the example illustrated here, the radius of the external surface 27 decreases substantially linearly along the decreasing segment 29. As a variant, this radius could decrease in the form of steps, for example in the form of a staircase. According to another variant embodiment, this radius could also decrease according to a curved form, for example an ellipse.

Preferably, the radius of the outer surface 27 decreases along the decreasing segment 29, according to an angle which is 20° or less relative to the axis X. Again preferably, this angle is greater than 0.1°.

In addition, the decreasing segment 29 preferably has a length in an axial direction of between 0.2 and 1 times the axial length of the outer surface 27 of the corresponding magnetic pole 19.

In this example, the outer surface 27 additionally comprises a chamfered segment 24 which extends from the outer axial surface 25 of the flange 18. In the example in FIG. 2, the decreasing segment 29 extends along the length of the outer surface 27, between the chamfered segment 24 and the free end 26.

Figure 3:
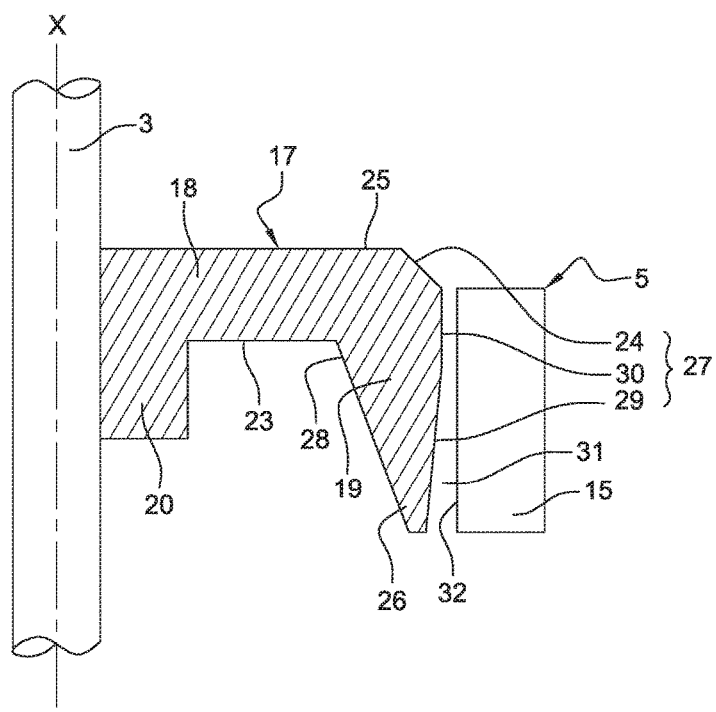
FIG. 3 represents schematically and partially a view in cross-section of part of a rotor and a stator according to another embodiment.

FIG. 3 illustrates another embodiment of the magnet wheel 17 of the rotor 4. In this embodiment, the outer surface 27 additionally has a constant segment 30 which is configured such that the radius between the outer surface 27 and the axis X of the rotor 4 is constant along the constant segment 30. Preferably, the constant segment 30 extends axially between the outer axial surface 25 of the flange 18 and the decreasing segment 29. In particular, in the example represented here, the constant segment 30 is adjacent to the chamfered segment 24 and to the decreasing segment 29.

Preferably, the constant segment has a length in an axial direction of between 0.3 and 0.8 times the length of the outer surface 27 of the corresponding magnetic pole 19. By selecting a ratio of this type, for each magnetic pole 19 the constant segment 30 is sized according to the total flux transferred by the magnetic pole from the rotor 4 to the stator 5, since the length of the magnetic pole 19 is of a size such as to transfer this flux. In addition, this ratio is selected taking into account the reluctance of the magnetic circuit of the magnetic pole.

Thus, in the example in FIG. 3, the outer surface 27 of the magnetic pole 19 comprises a chamfered segment 24, a constant segment 30 and a decreasing segment 29. As a variant, the outer surface 27 could comprise a plurality of constant segments 30 and/or a plurality of decreasing segments 29, arranged alternately with one another along the length of the outer surface 27.

According to one embodiment, each magnetic pole 19 of the magnet wheel 17 has an outer surface 27 as previously described. In addition, in another embodiment, each magnetic pole 19 of the two magnet wheels 17 of the rotor 4 has an outer surface 27 as previously described.

An outer surface 27 of this type of a rotor 4 can be formed directly during the process for production of the magnet wheel 17. In a variant embodiment, this outer surface 27 form can be machined once the rotor 4 has been formed. In both cases, the outer surface 27 is formed before the packing of the rotor 4.

The present invention also relates to a rotary electrical machine 1, such as an alternator or an alternator-starter, comprising a rotor 4 as previously described.

The fact that the outer surface 27 of the magnetic pole 19 has a decreasing segment 29 allows the rotary electrical machine 1 to have an air gap 31 with a width in a radial direction which increases when going axially towards the free end 26 of the said magnetic pole 19. An air gap 31 is defined as a space between an inner surface 32 of the stator 5, corresponding to the inner axial periphery of the said stator 5, and the outer surface 27 of one of the magnetic poles 19. The inner surface 32 and the outer surface 27 extend axially and are opposite one another.

Thus, the width of the air gap 31 varies. In particular, the width of the air gap 31 at the free end 26 is larger than the width of the air gap 31 at the area of the magnetic pole 19 which is close to the flange 18. The air gap 31 is thus maximal at the free end 26 of the magnetic pole 19.

In addition, the passage of the magnetic flux from the rotor 4 to the stator 5 is very strong in the area of the magnetic pole 19 close to the flange 18. Thus, reducing the air gap 31 in this area of passage of flux makes it possible globally to increase very substantially the passage of flux from the rotor 4 to the stator 5, for a given speed of rotation. This is all the more advantageous since the area of the free end 26 of each magnetic pole 19 is the area which is the most sensitive to the centrifuging effect generated by the rotation of the rotor 4. Thus, increasing the air gap 31 in the area of the free end 26 of the magnetic pole 19 makes it possible globally to increase the speed of rotation of the rotor 4 very substantially without increasing the risks of friction between the rotor 4 and the stator 5. The electric current produced, in particular the current output level, as well as the mechanical performance of a rotary electrical machine 1 of this type are therefore significantly improved. In fact, a rotary electrical machine of this type can then achieve speeds of rotation of the rotor of more than 20,000 rpm, and in particular approximately 23,800 rpm, without damaging the said machine.

For rotary electrical machine applications at speeds lower than 20,000 rpm, the present invention can make it possible to increase the length of the magnetic pole comprising an outer surface of this type. In fact, since the free end of the magnetic pole is further away from the stator, the constraints relating to the centrifuging effect of the said magnetic pole are reduced. Thus, the length of the magnetic pole can be increased in order to improve the electromagnetic performance of the rotor.

In addition, for the same reasons, the axial thickness of the flange of the magnet wheel can be reduced, and thus allow the rotor to have a larger number of wound conductors, for applications at speeds lower than 20,000 rpm.

In addition, the present invention makes it possible to produce a rotor for a rotary electrical machine in a manner which is simple, reliable, inexpensive and efficient, whilst improving its performance.

The invention has applications in particular in the field of rotors for alternators or alternator-starters, but it could also be applied to any type of rotary electrical machine comprising a rotor, in particular a claw rotor.

It will be appreciated that the foregoing description has been provided purely by way of example, and does not limit the field of the invention, from which replacement of the different elements by any other equivalents would not constitute a departure.

The invention claimed is:

1. A rotor (4) for a rotary electrical machine, fitted such as to rotate around an axis (X), and comprising a pair of magnet wheels (17) each having a flange (18) and a plurality of magnetic poles (19),
   each magnetic pole (19) extending axially from the flange (18) towards a free end (26) of the magnetic pole (19), and having an outer surface (27),
   the outer surface (27) of at least one magnetic pole (19) of at least one magnet wheel (17) having at least one decreasing segment (29) and at least one constant segment (30),
   the decreasing segment (29) being configured such that a radius between the outer surface (27) and the axis (X) of the rotor (4) decreases, when going along the decreasing segment (29), towards the free end (26) of the magnetic pole (19),
   the at least one constant segment (30) configured such that the radius between the outer surface (27) and the axis (X) of the rotor (4) is constant along the constant segment (30).

2. The rotor according to claim 1, wherein the radius decreases substantially linearly along the decreasing segment (29).

3. The rotor according to claim 2, wherein the radius decreases along the decreasing segment (29) according to an angle of 20° or less relative to the axis (X) of the rotor (4).

4. The rotor according to claim 2, wherein the decreasing segment (29) has a length in an axial direction of between 0.2 and 1 times the length of the outer surface (27) of the corresponding magnetic pole (19).

5. The rotor according to claim 2, wherein the decreasing segment (27) has two ends, one of the ends is combined with the free end (26) of the magnetic pole (19).

6. The rotor according to claim 1, wherein the radius decreases along the decreasing segment (29) according to an angle of 20° or less relative to the axis (X) of the rotor (4).

7. The rotor according to claim 6, wherein the decreasing segment (29) has a length in an axial direction of between 0.2 and 1 times the length of the outer surface (27) of the corresponding magnetic pole (19).

8. The rotor according to claim 6, wherein the decreasing segment (27) has two ends, and wherein one of the ends is combined with the free end (26) of the magnetic pole (19).

9. The rotor according to claim 1, wherein the decreasing segment (29) has a length in an axial direction of between 0.2 and 1 times the length of the outer surface (27) of the corresponding magnetic pole (19).

10. The rotor according to claim 9, wherein the decreasing segment (27) has two ends, and wherein one of the ends is combined with the free end (26) of the magnetic pole (19).

11. The rotor according to claim 1, wherein the decreasing segment (27) has two ends, and wherein one of the ends is combined with the free end (26) of the magnetic pole (19).

12. The rotor according to claim 1, wherein the outer surface (27) additionally has a chamfered segment (24) which extends from an outer axial end (25) of the flange (18).

13. The rotor according to claim 1, wherein the outer surface (27) additionally has a chamfered segment (24) which extends from an outer axial end (25) of the flange (18); and wherein the constant segment (30) is adjacent to the chamfered segment (24) and to the decreasing segment (29).

14. The rotor according to claim 1, wherein the constant segment (30) extends axially between an outer axial end (25) of the flange (18) and the decreasing segment (29).

15. The rotor according to claim 1, wherein the constant segment (30) has a length in an axial direction of between 0.3 and 0.8 times the length of the outer surface (27) of the corresponding magnetic pole (19).

16. The rotor according to claim 1, wherein each magnetic pole (19) of one of the magnet wheels (17) has an outer surface (27) comprising at least one decreasing segment (29).

17. The rotor according to claim 1, wherein each magnetic pole (19) of the two magnet wheels (17) has an outer surface (27) comprising at least one decreasing segment (29).

18. The rotor according to claim 1, wherein each magnetic pole (19) is in the form of a claw.

19. A rotary electrical machine, wherein it comprises a rotor (4) according to claim 1.

20. The rotary electrical machine according to claim 19, which forms an alternator or an alternator-starter.

* * * * *